US010367682B2

(12) United States Patent
Sasi et al.

(10) Patent No.: US 10,367,682 B2
(45) Date of Patent: Jul. 30, 2019

(54) NODE FAILURE RECOVERY TOOL

(71) Applicant: Bank of America Corporation, Charlotte, NC (US)

(72) Inventors: Akhil Sasi, Hoboken, NJ (US); William Lotridge, Brentwood, NY (US); Dinesh Chandramohan, Jersey City, NJ (US)

(73) Assignee: Bank of American Corporation, Charlotte, NC (US)

( * ) Notice: Subject to any disclaimer, the term of this patent is extended or adjusted under 35 U.S.C. 154(b) by 55 days.

(21) Appl. No.: 15/639,270

(22) Filed: Jun. 30, 2017

(65) Prior Publication Data

US 2019/0007261 A1  Jan. 3, 2019

(51) Int. Cl.
*H04L 12/24* (2006.01)
*H04L 12/26* (2006.01)

(52) U.S. Cl.
CPC ...... *H04L 41/0672* (2013.01); *H04L 41/0677* (2013.01); *H04L 43/0864* (2013.01); *H04L 43/0852* (2013.01); *H04L 43/0888* (2013.01)

(58) Field of Classification Search
CPC .................. H04L 41/0672; H04L 41/0677
See application file for complete search history.

(56) References Cited

U.S. PATENT DOCUMENTS

| | | | |
|---|---|---|---|
| 6,078,930 A * | 6/2000 | Lee | G06F 11/1415 |
| 6,324,162 B1 * | 11/2001 | Chaudhuri | H04B 1/745 |
| | | | 340/2.9 |
| 6,396,805 B2 * | 5/2002 | Romrell | H04L 67/06 |
| | | | 370/216 |
| 6,789,114 B1 | 9/2004 | Garg et al. | |
| 9,021,091 B2 | 4/2015 | Cheung et al. | |
| 9,049,126 B2 | 6/2015 | Cheung et al. | |
| 9,202,249 B1 | 12/2015 | Coehn et al. | |
| 9,292,370 B2 * | 3/2016 | Magoshi | H04L 67/00 |
| 9,319,164 B2 * | 4/2016 | Barry | H04J 3/0667 |
| 9,344,447 B2 | 5/2016 | Cohen et al. | |
| 9,413,454 B1 * | 8/2016 | Reddy Bovilla | H04B 10/03 |
| 9,454,785 B1 | 9/2016 | Hunter et al. | |
| 9,521,089 B2 | 12/2016 | Hu et al. | |
| 9,524,328 B2 | 12/2016 | Horowitz et al. | |
| 9,888,397 B1 * | 2/2018 | Puranik | H04W 24/04 |
| 10,049,023 B1 * | 8/2018 | Bhalerao | G06F 11/2033 |
| 2002/0181409 A1 * | 12/2002 | Shen | H04L 45/02 |
| | | | 370/252 |

(Continued)

*Primary Examiner* — Parth Patel
(74) *Attorney, Agent, or Firm* — Michael A. Springs

(57) ABSTRACT

A node failure recovery tool includes an interface and one or more processors. The interface is configured to receive one or more portions of state information from a first node, each of the one or more portions of state information comprising data corresponding to a user and an action and an indication of whether the portion of state information is related to one or more other portions of state information. The one or more processors are configured to determine a time corresponding to each of the one or more portions of state information and determine that the first node has crashed. The one or more processors are further configured to determine the portion of state information that was last received from the first node and send, to the first node, the portion of state information that was last received from the first node.

20 Claims, 7 Drawing Sheets

(56) References Cited

U.S. PATENT DOCUMENTS

| | | | |
|---|---|---|---|
| 2007/0245201 A1* | 10/2007 | Sammour | H04L 1/1628 714/748 |
| 2008/0195912 A1* | 8/2008 | Mende | H03M 13/09 714/752 |
| 2009/0034459 A1* | 2/2009 | Shousterman | H04L 12/189 370/329 |
| 2009/0086735 A1* | 4/2009 | Tsang | H04L 1/1874 370/394 |
| 2009/0109843 A1* | 4/2009 | Yang | H04L 12/66 370/225 |
| 2009/0168643 A1* | 7/2009 | Jin | H04L 12/437 370/222 |
| 2010/0214931 A1* | 8/2010 | Wigren | H04B 17/327 370/242 |
| 2010/0238790 A1* | 9/2010 | Liu | H04L 12/2861 370/216 |
| 2012/0079001 A1* | 3/2012 | Chincisan | H04L 12/40013 709/203 |
| 2014/0006845 A1* | 1/2014 | Madaiah | H04L 45/02 714/4.1 |
| 2014/0129876 A1* | 5/2014 | Addepalli | H04L 41/064 714/37 |
| 2014/0143589 A1* | 5/2014 | Jeon | H04L 43/0817 714/4.2 |
| 2014/0254351 A1* | 9/2014 | Newman | H04L 41/0659 370/228 |
| 2014/0289165 A1 | 9/2014 | Dinesh Chheda | |
| 2015/0049703 A1* | 2/2015 | Nobukiyo | H04L 5/0057 370/329 |
| 2015/0120524 A1 | 4/2015 | Domowitz et al. | |
| 2015/0180786 A1* | 6/2015 | Chen | H04L 47/286 370/235 |
| 2015/0186995 A1 | 7/2015 | Renalds et al. | |
| 2015/0339994 A1* | 11/2015 | Verbeure | G09G 3/2044 345/214 |
| 2016/0044527 A1* | 2/2016 | Long | H04L 1/1642 370/235 |
| 2016/0063628 A1 | 3/2016 | Kreider et al. | |
| 2016/0105704 A1* | 4/2016 | Gardner | H04N 21/2662 725/109 |
| 2016/0219539 A1* | 7/2016 | Kim | H04W 56/001 |
| 2016/0292008 A1 | 10/2016 | Kumar et al. | |
| 2016/0294508 A1* | 10/2016 | Takeuchi | H04L 1/0009 |
| 2016/0307267 A1 | 10/2016 | Chen et al. | |
| 2016/0328798 A1 | 11/2016 | Thakkar | |
| 2016/0337467 A1 | 11/2016 | Parmar et al. | |
| 2017/0126482 A1* | 5/2017 | Jayaraman | H04L 41/0668 |
| 2017/0214550 A1* | 7/2017 | Kumar | H04L 41/0654 |
| 2017/0269986 A1* | 9/2017 | Sobue | G06F 11/34 |
| 2017/0310764 A1* | 10/2017 | Touitou | H04L 67/06 |
| 2018/0027432 A1* | 1/2018 | Sonobe | H04L 1/22 370/219 |
| 2018/0034686 A1* | 2/2018 | Vaidyanathan | H04L 41/0677 |
| 2018/0102951 A1* | 4/2018 | Wu | H04L 41/0654 |
| 2018/0103271 A1* | 4/2018 | Wang | H04N 19/66 |
| 2018/0115455 A1* | 4/2018 | Serrano Garcia | H04L 41/16 |
| 2018/0212818 A1* | 7/2018 | Ide | H04L 41/0654 |
| 2018/0275646 A1* | 9/2018 | Zhang | G05B 23/0264 |
| 2018/0295010 A1* | 10/2018 | Grobe | G06Q 10/08 |
| 2018/0302334 A1* | 10/2018 | Osterlund | H04L 47/283 |

* cited by examiner

NODE FAILURE RECOVERY TOOL

TECHNICAL FIELD

This disclosure relates generally to node failures on a network. More specifically, this disclosure relates to a node failure recovery tool to facilitate the recovery of a node after a node failure.

BACKGROUND

Generally, a node in a network may communicate information with one or more other nodes on the network. As an example, a first node may communicate information with a second node when the second node must be updated with the information. The information being communicated may be sent in portions or phases to the one or more other nodes. In some circumstances, a node responsible for communicating the information may crash or otherwise fail, which can prevent the intended recipient node from receiving one or more portions of information.

SUMMARY OF THE DISCLOSURE

According to one embodiment, a node failure recovery tool includes an interface and one or more processors. The interface is configured to receive one or more portions of state information from a first node, each of the one or more portions of state information comprising data corresponding to a user and an action and an indication of whether the portion of state information is related to one or more other portions of state information. The one or more processors are configured to determine a time corresponding to each of the one or more portions of state information and determine that the first node has crashed by identifying that a received portion of state information is related to one or more other portions of state information and determining that the interface did not receive the one or more other related portions of state information. The one or more processors are further configured to determine, based on the time corresponding to each of the one or more portions of state information, the portion of state information that was last received from the first node after determining that the first node has crashed. The one or more processors are further configured to send, to the first node, the portion of state information that was last received from the first node, wherein the first node uses the state information that was last received from the first node to recover from the crash.

According to another embodiment, a method includes receiving, at an interface, one or more portions of state information from a first node, each of the one or more portions of state information comprising data corresponding to a user and an action and an indication of whether the portion of state information is related to one or more other portions of state information. The method further includes determining a time corresponding to each of the one or more portions of state information and determining that the first node has crashed, wherein determining that the first node has crashed includes identifying that a received portion of state information is related to one or more other portions of state information and determining that the interface did not receive the one or more other related portions of state information. After determining that the first node has crashed, the method further includes determining, based on the time corresponding to each of the one or more portions of state information, the portion of state information that was last received from the first node and sending, to the first node, the portion of state information that was last received from the first node, wherein the first node uses the state information that was last received from the first node to recover from the crash.

According to another embodiment, a system includes a first node and a node failure recovery tool. The first node is configured to send one or more portions of state information, wherein each portion of state information includes data corresponding to a user and an action and an indication of whether the portion of state information is related to one or more other portions of state information. The node failure recovery tool includes an interface and one or more processors. The interface is configured to receive one or more portions of state information from a first node. The one or more processors are configured to determine a time corresponding to each of the one or more portions of state information and determine that the first node has crashed, wherein determining that the first node has crashed includes identifying that a received portion of state information is related to one or more other portions of state information and determining that the interface did not receive the one or more other related portions of state information. The one or more processors are further configured to determine, based on the time corresponding to each of the one or more portions of state information after determining that the first node has crashed and to send, to the first node, the portion of state information that was last received from the first node, wherein the first node uses the state information that was last received from the first node to determine a next portion of data to send to the second node.

According to one embodiment, a node failure recovery tool includes an interface and one or more processors. The interface is configured to receive a first portion and a second portion of state information from a first node, each of the first and second portion of state information comprising data about a user and an action and an indication that a third portion of state information is to be received. The one or more processors are configured to determine a time that the first portion of state information was received, and store, in a memory, the first portion of state information and the time that the first portion of state information was received. The one or more processors are further configured to determine a time that the second portion of state information was received and start a timer upon receiving the second portion of state information from the first node, determine that the second portion of state information includes data about a first user and a first action, and determine that the stored first portion of state information includes data about the first user and the first action. The one or more processors are further configured to replace, in the memory, the first portion of state information with the second portion of state information in response to determining that the time that the second portion of state information was received is later than the time that the first portion of state information was received and that the first and second portions of state information includes data about the first user and the first action. The one or more processors are further configured to determine that the timer has expired and that the third portion of state information has not been received, and, upon determining that the timer has expired and that the third portion of state information has not been received, determine that the first node has crashed. After determining that the first node has crashed, the one or more processors are further configured to retrieve, from the memory the second portion of state information and send the retrieved second portion of state information to the first node so that the first node can recover from the crash.

According to another embodiment, a method includes receiving a first portion and a second portion of state information from a first node, each of the first and second portion of state information comprising data about a user and an action and an indication that a third portion of state information is to be received. The method further includes determining a time that the first portion of state information was received and storing, in a memory, the first portion of state information and the time that the first portion of state information was received. The method further includes determining a time that the second portion of state information was received and start a timer upon receiving the second portion of state information from the first node, determining that the second portion of state information includes data about a first user and a first action, and determining that the stored first portion of state information includes data about the first user and the first action. Further, the method includes, replacing, in the memory, the first portion of state information with the second portion of state information in response to determining that the time that the second portion of state information was received is later than the time that the first portion of state information was received and that the first and second portions of state information includes data about the first user and the first action, determining that the timer has expired and that the third portion of state information has not been received, and, determining that the first node has crashed upon determining that the timer has expired and that the third portion of state information has not been received. The method further includes, after determining that the first node has crashed, retrieving, from the memory, the second portion of state information and sending the retrieved second portion of state information to the first node so that the first node can recover from the crash.

According to yet another embodiment, a system includes a first node and a node failure recovery tool. The first node is configured to send a first portion and a second portion of state information, each of the first and second portion of state information comprising data about a user and an action and an indication that a third portion of state information is to be received. The node failure recovery tool includes an interface and one or more processors. The interface is configured to receive the first portion and the second portion of state information from the first node. The one or more processors are configured to determine a time that the first portion of state information was received and store, in a memory, the first portion of state information and the time that the first portion of state information was received. The one or more processors are further configured to determine a time that the second portion of state information was received and start a timer upon receiving the second portion of state information from the first node, determine that the second portion of state information includes data about a first user and a first action, and determine that the stored first portion of state information includes data about the first user and the first action. In response to determining that the time that the second portion of state information was received is later than the time that the first portion of state information was received and that the first and second portions of state information includes data about the first user and the first action, the one or more processors are further configured to replace, in the memory, the first portion of state information with the second portion of state information. The one or more processors are further configured to determine that the timer has expired and that the third portion of state information has not been received and, upon determining that the timer has expired and that the third portion of state information has not been received, determine that the first node has crashed. After determining that the first node has crashed, the one or more processors are further configured to retrieve, from the memory, the second portion of state information and send the retrieved second portion of state information to the first node so that the first node can recover from the crash.

Certain embodiments may provide one or more technical advantages. For example, an embodiment of the present disclosure may improve network bandwidth usage by preventing redundant transmission of data after a node has failed. As another example, an embodiment of the present disclosure may improve the ability for a node to recover after a crash by communicating a pre-crash state to the node. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Embodiments of the present disclosure and its advantages are best understood by referring to FIGS. 1 through 7 of the drawings, like numerals being used for like and corresponding parts of the various drawings.

A node responsible for communicating one or more portions of information to another node may crash or otherwise fail before the intended recipient node has received each portion of information. In such a scenario, the intended recipient node is left with incomplete (or in some cases, totally unusable) information. The conventional method for recovering from a crash involves taking periodic snapshots of state information for the system and notifying the recovering node of the last-saved state information. Although the conventional method may facilitate node recovery, reliance on last-saved state information may result in the double-sending and/or double-processing of information because the last-saved state may not indicate the state of the node immediately before the crash. For example, reliance on the last-saved state information may cause the recovering node to communicate information it had previously communicated to another node thus wasting network bandwidth. As another example, reliance on the last-saved state information may cause the intended recipient node to receive information it had previously received and to make determinations about whether to disregard certain portions of information following a node crash within the system, thus wasting processing resources and time. Therefore, the conventional method of node recovery may be inefficient because of the sending and receiving of duplicative information and because it may result in longer processing times.

This disclosure contemplates an unconventional system wherein state information is embedded within the communications that are sent from a node to another node and a node failure recovery tool (also referred to herein as "NFRT") that monitors the communications between nodes. Upon determining that a node has crashed, the node failure recovery tool may alert the recovering node of the state information last sent from the recovering node to facilitate node recovery. In some embodiments, the node failure recovery tool facilitates node recovery by updating, in a memory, the state information last received from the recovering node and by sending the stored state information to the recovering node once the node becomes operational. In this manner, each portion of information is sent exactly once and the system avoids any duplicative sending and processing. Accordingly, the node failure recovery tool may improve the underlying computers and network by improving the efficiency of communications between nodes and reduce the time needed for a node to recover from a crash.

Figure 1:
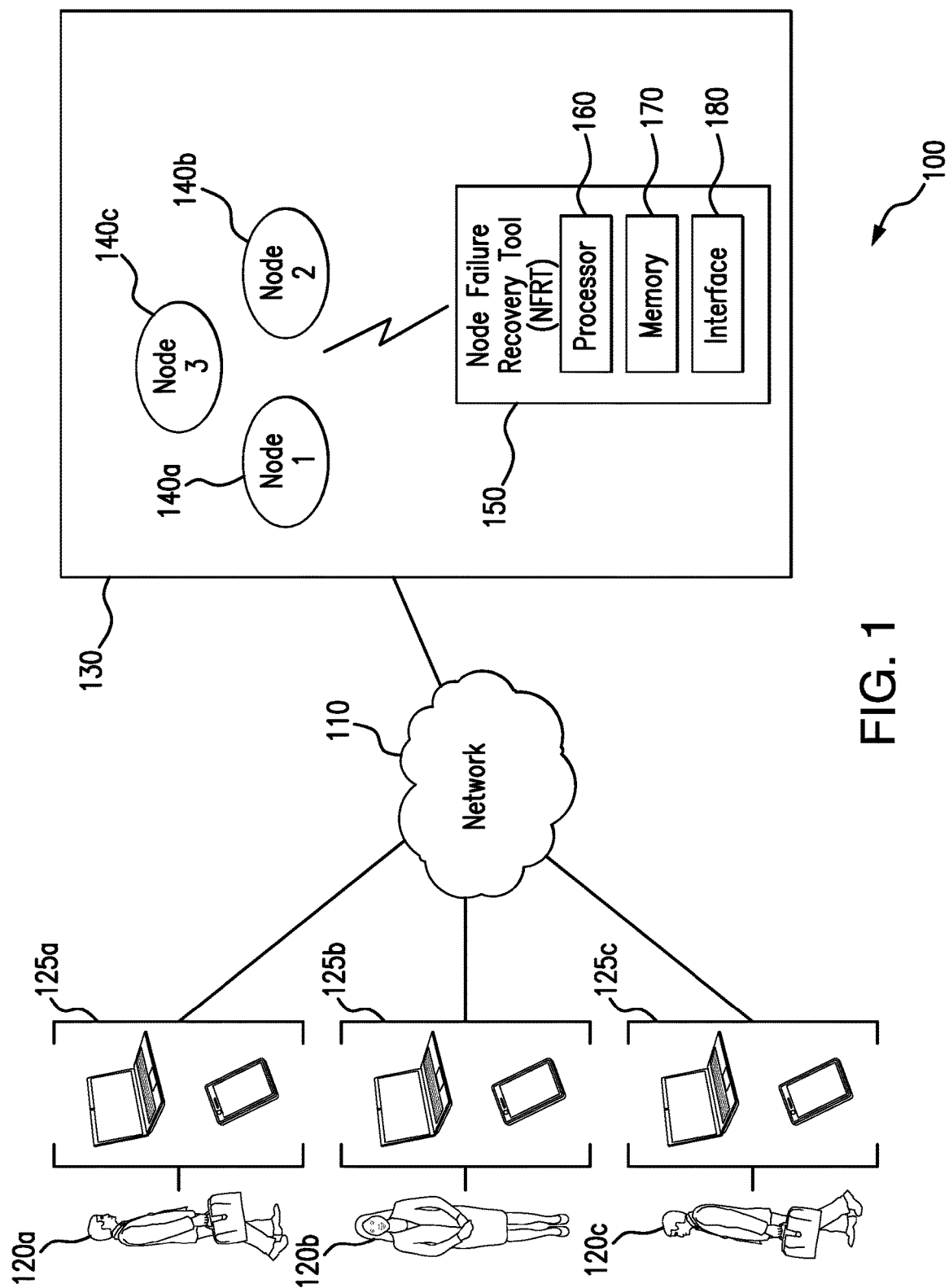
FIG. 1 is a block diagram illustrating a network environment for a system comprising a node failure recovery tool, according to certain embodiments.

FIG. 1 illustrates a network environment 100 for a system 130 that facilitates node recovery using a node failure recovery tool 150. As illustrated in FIG. 1, network environment 100 includes a network 110, one or more users 120, devices 125, and system 130. In some embodiments, system 130 may include one or more nodes 140 and node failure recovery tool 150. Generally, node failure recovery tool 150 facilitates the recovery of node(s) 140 upon determining that node(s) 140 have crashed or otherwise failed.

Network 110 may facilitate communication between and amongst components of network environment 100. This disclosure contemplates network 110 being any suitable network operable to facilitate communication between the components of network environment 100. For example, network 110 may permit users 120 to interact with system 130. As another example, network 110 may permit users 120 to interact with each other. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As described above, network environment 100 may include one or more users 120 in some embodiments. As depicted in FIG. 1, network environment 100 includes three users 120a, 120b, and 120c. As is also depicted in FIG. 1, each user 120 is associated with one or more devices 125. For example, user 120a is associated with devices 125a, user 120b is associated with devices 125b, and user 120c is associated with devices 125c. In some embodiments, users 120 use devices 125 to interact with system 130 over network 110. For example, users 120 may use devices 125 to update account information, make withdrawals, and/or deposit funds. In some embodiments, a user's interactions with system 130 may require one or more nodes 140 of system 130 to communicate with one or more other nodes 140.

As another example, user 120b may use device 125b to send information about a malfunction or other error of system 130. One or more nodes 140 of system 130 may be involved with the handling and resolution of issues reported by users 120 via devices 125. For example, node 140a may be responsible for identifying the reported issue and communicating the reported issue to appropriate nodes 140 of system 130 that can resolve the reported issue (e.g., node 2 140b). As such, node 1 140a may receive a report from user 120b that she is unable to connect to system 130. In response, node 1 140a may identify the issue as a connectivity issue and relay the issue and associated information to node 2 140b which may be responsible for resolving connectivity issues. Although particular interactions have been described herein, this disclosure recognizes that users 120 may interact with system 130 in any suitable manner.

This disclosure contemplates device 125 being any appropriate device that can communicate over network 110. For example, device 125 may be a computer, a laptop, a wireless or cellular telephone, an electronic notebook, a personal digital assistant, a tablet, a server, a mainframe, or any other device capable of receiving, processing, storing, and/or communicating information with other components of system 100. Device 125 may also include a user interface, such as a display, a microphone, keypad, or other appropriate terminal equipment usable by a user. In some embodiments, an application executed by device 125 may perform the functions described herein.

System 130 includes one or more nodes 140. As described above, each node 140 may be responsible for updating and/or maintaining information. In some embodiments, system 130 includes one or more back-up nodes. As an example, node 3 140c may be configured to update and/or maintain the same type of information as node 1 140a. Such back-up nodes may be configured to operate only when the node that they are backing up has crashed or otherwise failed. As an example, node 3 140c may be configured to send details of user 120a's interaction with node 2 140b when node 1 140a has failed.

System 130 also includes node failure recovery tool 150. As described above, node failure recovery tool 150 may facilitate the recovery of nodes 140 after determining that nodes 140 have crashed or otherwise failed. This and other functionality of node failure recovery tool 150 will be described in further detail below in reference to FIGS. 2-6. In some embodiments, node failure recovery tool 150 is positioned in a middleware layer of a distribution system. Node failure recovery tool 150 includes one or more processors, one or more memories, and one or more interfaces. As illustrated in FIG. 1, node failure recovery tool 150 includes a processor 160, a memory 170, and an interface 180.

Processor 160 executes various methods (e.g., methods 600 and 700 illustrated in FIGS. 6 and 7) of node failure recovery tool 150. In some embodiments, memory 170 is configured to store information such as algorithms that correspond to methods (e.g., methods 600 and 700 illustrated in FIGS. 6 and 7) executed by node failure recovery tool 150. Memory 170 stores the information, or portions of information, communicated between nodes 140. For example, node failure recovery tool 150 may store state information corresponding to data sent from node 1 140*a* to node 2 140*b* in memory 170. Although this disclosure describes and depicts node failure recovery tool 150 including memory 170, this disclosure recognizes that node failure recovery tool 150 may not include memory 170 in some embodiments. For example, memory 170 may be a stand-alone component or part of a component connected to network 110, such as a database accessible to node failure recovery tool 150 via network 110.

Interface 180 of node failure recovery tool 150 is configured to receive information. The received information may include one or more portions of information and may be received from nodes 140. As an example, interface 180 may be configured to receive one or more portions of information 210 communicated between node 1 140*a* and node 2 140*b*. Each portion of information received by interface 180 includes state information. State information may include data corresponding to a particular user, data corresponding to a particular action, and/or an indication of whether the portion of state information is related to one or more other portions of state information. For example, state information may be received by interface 180 that includes data indicating that user 120*a* wants to log in to system 130 using user 120*a*'s username and password. Such state information may further include an indication that details about this interaction will be sent in three separate portions (e.g., 210*a*, 210*b*, and 210*c* in FIG. 2). Although this disclosure describes that state information may include certain types of information, this disclosure recognizes that state information may include any suitable type of information.

In some embodiments, node failure recovery tool 150 may be a program executed by a computer system. As an example, node failure recovery tool 150 may be executed by a computer such as computer 700 described below in reference to FIG. 7. In such example, memory 170 may be memory 720, processor 160 may be processor 710 of computer 700, and interface 180 may be interface 750.

Figure 2:
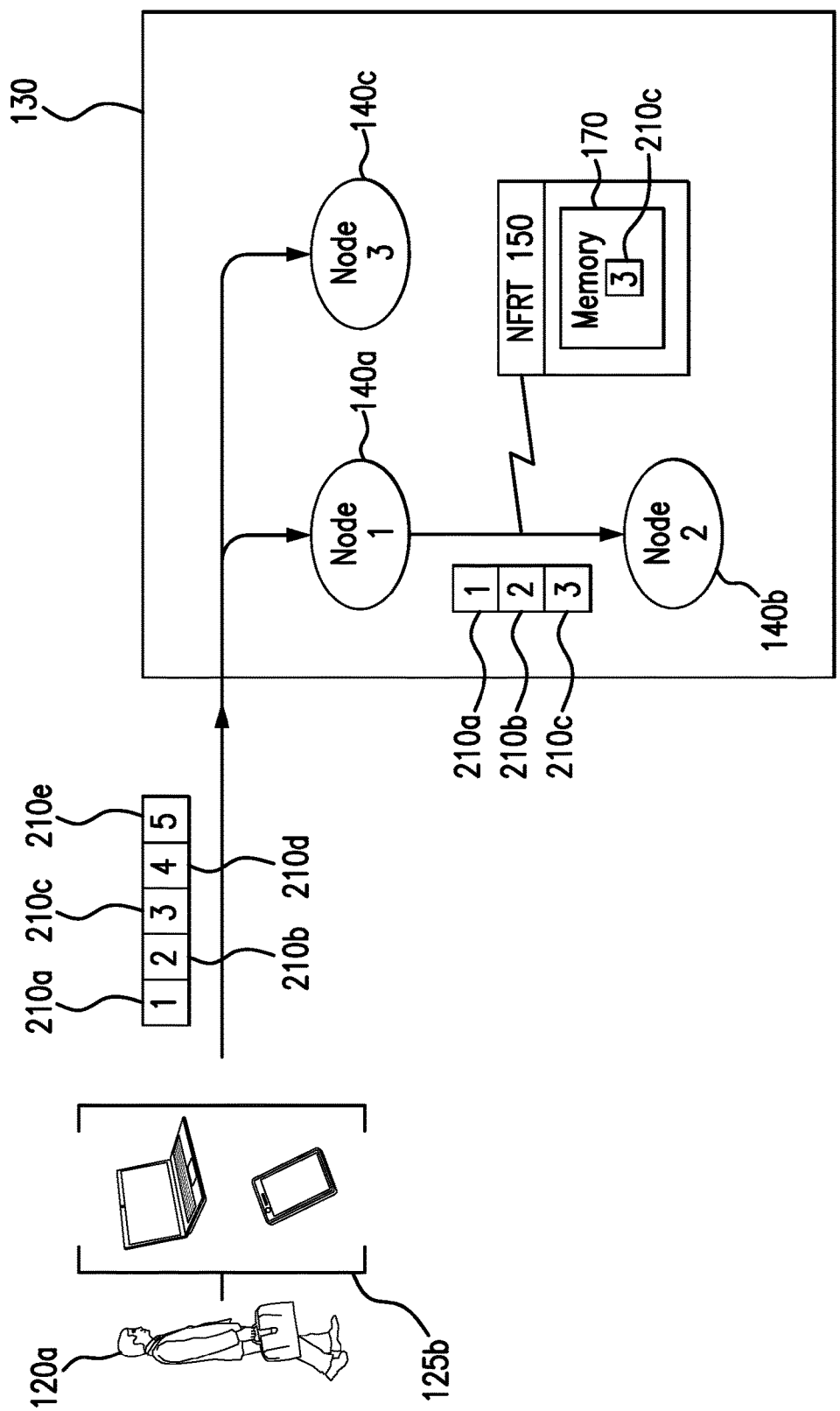
FIG. 2 is a block diagram illustrating a user interacting with the system of FIG. 1, according to certain embodiments.

FIG. 2 illustrates a user 120 interacting with system 130. Generally, FIG. 2 illustrates system 130 receiving information 210 from users 120. Information 210 may comprise one or more portions. As illustrated in FIG. 2, information 210 comprises five portions 210*a-e*. Each portion of information (e.g., 210*a-e*) may include state information that includes data corresponding to a user 120 and an action related to the user 120 and an indication of whether the portion of state information is related to one or more other portions of state information. For example, portion 210*a* may include state information regarding user 120*a* and an action of user 120*a* (e.g., update address on account). State information included in portion 210*a* may also include an indication that it is related to portions 210*b-e*.

Portions of information 210*a-e* may be sent over network 110 to system 130 and may be relayed between one or more nodes 140. As illustrated in FIG. 2, node 1 140*a* and node 3 140*c* receive information portions 210*a-e*. Although this disclosure describes and depicts that only two nodes 140 receive information portions 210, this disclosure recognizes that any suitable number of nodes 140 may receive information portions 210. In some embodiments, the nodes that receive information portions 210 may be configured to communicate one or more of the received information portions 210 to another node 140 in system 130. As is illustrated in FIG. 2, node 1 140*a* is configured to send one or more portions of portions 210*a-e* to node 2 140*b*. As described above, node 3 140*c* may also be configured to send one or more portions of portions 210*a-e* to node 2 140*b* but it is only configured to do so when node 1 140*a* is not operational.

Node failure recovery tool 150 receives state information about each information portion 210 communicated between and/or amongst nodes 140. For example, as illustrated in FIG. 2, node failure recovery tool 150 is configured to receive state information corresponding to information portions 210*a-c* sent from node 1 140*a* to node 2 140*b*. Node failure recovery tool 150 may be configured to determine, for each information portion 210 sent from one node 140 to another, a time corresponding to the information portion 210. In some embodiments, the time determined by node failure recovery tool 150 for an information portion 210 is the time that interface 180 of node failure recovery tool 150 received state information corresponding to an information portion 210. As an example, node failure recovery tool 150 may determine that the time corresponding to information portion 210*a* is 12:00:01 p.m. because it received the state information of information portion 210*a* at 12:00:01 p.m. As another example, node failure recovery tool 150 may determine that the time corresponding to information portion 210*b* is 12:00:03 p.m. because it received the state information of information portion 210*b* at 12:00:03 p.m. As yet another example, node failure recovery tool 150 may determine that the time corresponding to information portion 210*c* is 12:00:05 p.m. because it received the state information of information portion 210*c* at 12:00:05 p.m.

As described above, node failure recovery tool 150 may be configured to store state information and information about state information. As an example, node failure recovery tool 150 may store state information corresponding to one or more information portions 210 in memory 170. As another example, node stat recovery tool 150 may store the determined time corresponding to the state information. In some embodiments, node failure recovery tool 150 is configured to store all state information and/or information about state information. In other embodiments, node failure recovery tool 150 selectively stores state information and/or information about state information. Node failure recovery tool 150 may be further configured to store a particular portion of state information and subsequently replace the stored state information with a related portion of state information. Stated differently, node failure recovery tool 150 may be configured to replace, in memory 170, older state information with newer state information related to the same user and the same action. As an example, node failure recovery tool 150 may receive information portion 210*a* comprising a first state information and store first state information in memory 170. Subsequently, node failure recovery tool 150 may receive information portion 210*b* comprising a second state information (related to the same user and same action as the state information of information portion 210*a*) and replace, in memory 170, first state information with second state information.

The replacement of state information may be further understood in reference to FIG. 2. As illustrated in FIG. 2, node 1 140*a* sends information portions 210*a-c* to node 2 140*b*. Node failure recovery tool 150 may monitor the communications between node 1 140*a* and node 2 140*b* and store state information corresponding to each information portion 210 sent by node 1 140*a*. For example, upon determining that node 1 140*a* sent information portion 210*a*, node failure recovery tool 150 may store, in memory 170, state information corresponding to information portion 210a. Subsequently, upon determining that node 1 140a sent information portion 210b to node 2 210b, node failure recovery tool 150 may replace, in memory 170, state information corresponding to information portion 210a with state information corresponding to information portions 210b. As illustrated in FIG. 2, node failure recovery tool 150 has determined that node 1 140a has sent information portion 210c to node 2 140b and replaced, in memory 170, state information corresponding to information portion 210b with state information corresponding to information portions 210c. In this manner, node failure recovery tool 150 may store the state information corresponding to the information portion 210 most recently sent by node 1 140a.

In some embodiments, determining whether to replace state information in memory includes identifying that the second state information includes information about the same user 120 and action as the first state information and determining that the second state information was received at a later time than the first state information. Taking the example above, node failure recovery tool 150 may store state information corresponding to information portion 210a (received at 12:00:01 p.m.), and upon determining that state information corresponding to information portion 210b (received at 12:00:03 p.m.) includes information about the same user 120 and the same action, replace state information corresponding to information portion 210a in memory with state information corresponding to information portion 210b.

As will be explained in further detail below in reference to FIGS. 3-6, node failure recovery tool 150 may be configured to determine that a node 140 of system 130 has crashed or otherwise failed. In some embodiments, node failure recovery tool 150 may determine that a node 140 has crashed by keeping track of the time elapsed between receipt or non-receipt of related portions of state information. For example, node failure recovery tool 150 may start a timer upon receiving, from a first node (e.g., node 1 140a), state information indicating that related state information will be sent by the first node (e.g., node 1 140a). If, upon expiration of the timer, node failure recovery tool 150 has not received the related state information, node failure recovery tool 150 may determine that the first node has crashed. In contrast, if node failure recovery tool 150 determines that the related state information has been received prior to expiration of the timer, node failure recovery tool 150 may determine that the first node has not crashed. In some embodiments, the amount of time on the timer is always the same (e.g., 2 seconds). In other embodiments, the amount of time on the timer depends on some external factor (e.g., user 120's strength of connection to network 110 or the congestion of network 110). In yet other embodiments, the amount of time on the timer is set by an administrator of system 130. Although this disclosure describes particular ways to determine the amount of time on a timer, this disclosure recognizes that the amount of time on the timer may be any suitable time and may depend on any suitable factor.

Figure 3:
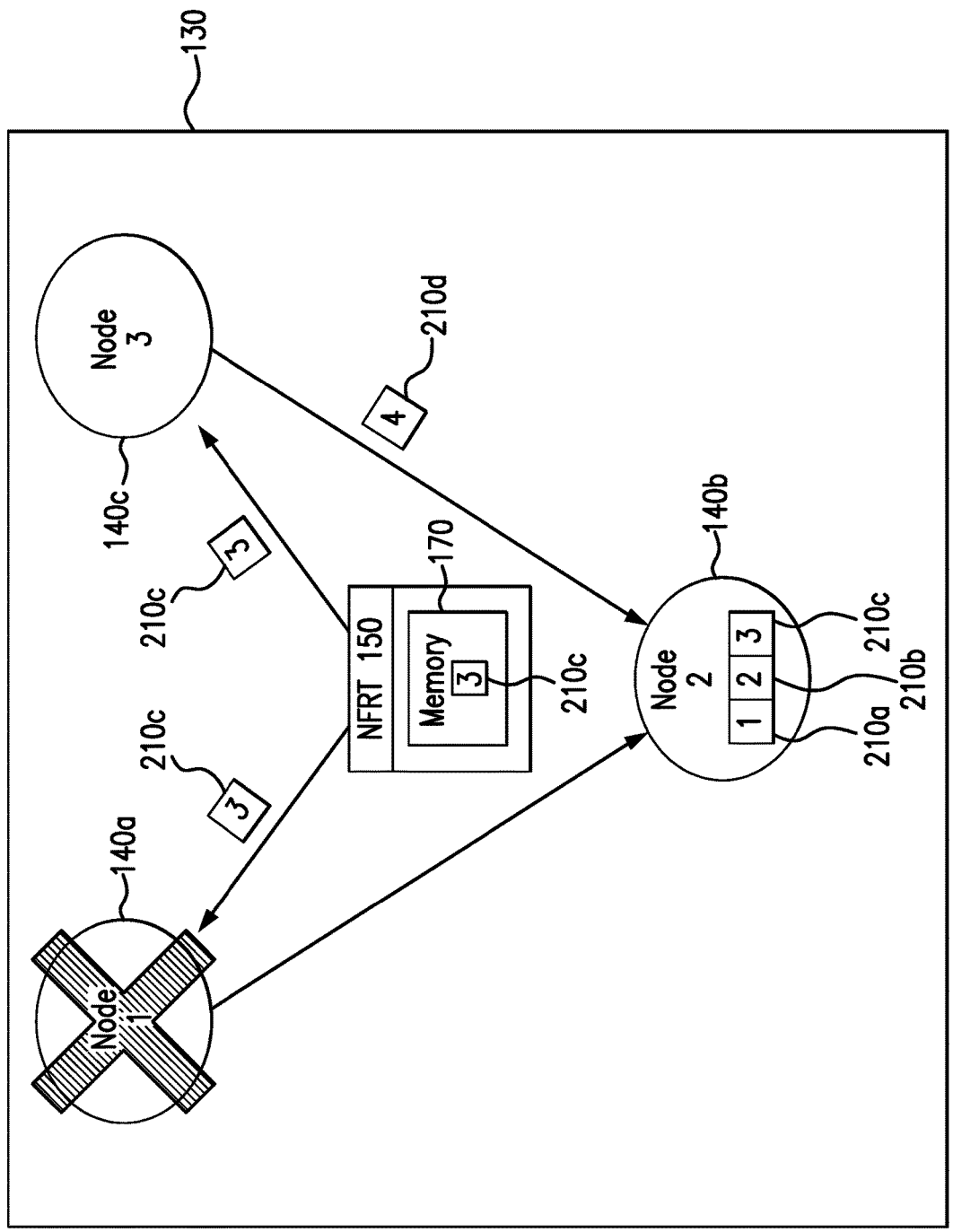
FIG. 3 is a block diagram illustrating an embodiment of the system of FIG. 1 after the node failure recovery tool of FIG. 1 has detected a node crash, according to certain embodiments.

FIG. 3 illustrates an embodiment of system 130 after node failure recovery tool 150 has determined that node 1 140a has crashed. As described above, node failure recovery tool 150 may determine that node 1 140a has crashed because it did not receive a portion of state information that it was expecting to receive prior to the expiration of a timer. In some embodiments, node failure recovery tool 150 facilitates the recovery of a crashed node after discovering that a node has crashed. For example, in response to determining that node 1 140a has crashed, node state failure recovery tool 150 may facilitate the recovery of node 1 140a. In some embodiments, facilitating the recovery of a node 140 includes determining the portion of state information that was last received from the crashed node and sending that portion of state information to the crashed node once the crashed node becomes operational. As an example, node failure recovery tool 150 may retrieve, from memory 170, the state information last received from the crashed node and send the retrieved state information to the crashed node. In some embodiments, node failure recovery tool 150 sends the retrieved state information to the crashed node immediately after determining that the crashed node has crashed. In other embodiments, node failure recovery tool 150 sends the retrieved state information to the crashed node after determining that the crashed node has become operational. Node failure recovery tool 150 may determine that the crashed node has become operational based on receiving a start-up message (see e.g., start-up message 410 of FIG. 4) from the crashed node. Node 1 140a may use the state information 210 received from node failure recovery tool 150 (e.g., state information 210c) to recover from the crash. For example, node 1 140a may determine, based on the state information 210 received from node failure recovery tool 150 (e.g., state information 210c) to send the next-in-sequence information portion (e.g., state information 210d) to node 2 140b. As a result, node 1 140a does not send the same state information to node 2 140b more than one time and node 2 140b does not have to process previously received state information more than once.

In other embodiments, node failure recovery tool 150 may retrieve, from memory 170, the state information last received from the crashed node and send the retrieved state information to a node other than the crashed node. This example is illustrated in FIG. 3. Specifically, FIG. 3 illustrates node 3 140c communicating information portions 210 to node 2 140b during the time that node 1 140a has crashed. As described above with regards to FIG. 1, node 3 140c may be a back-up node to node 1 140a which receives the same information portions 210 as node 1 140a. In response to receiving state information from node failure recovery tool 150 (illustrated in FIG. 3 as information portion 210c), node 3 140c may become operational and send the next-in-sequence information portion 210 (e.g., information portion 210d) to node 2 140b. After receiving state information corresponding to the next-in-sequence information portion 210, node failure recovery tool 150 may replace, in memory 170, previously stored state information with state information corresponding to the next-in-sequence information portion 210 (e.g., replace state information corresponding to information portion 210c with state information corresponding to information portion 210d). This disclosure recognizes various benefits associated with utilizing back-up node 3 140c during the periods of time while node 1 140a is down. For example, utilizing back up node 3 140c may decrease the time it takes to communicate related portions 210 of information from one node 140 to another.

Figure 4:
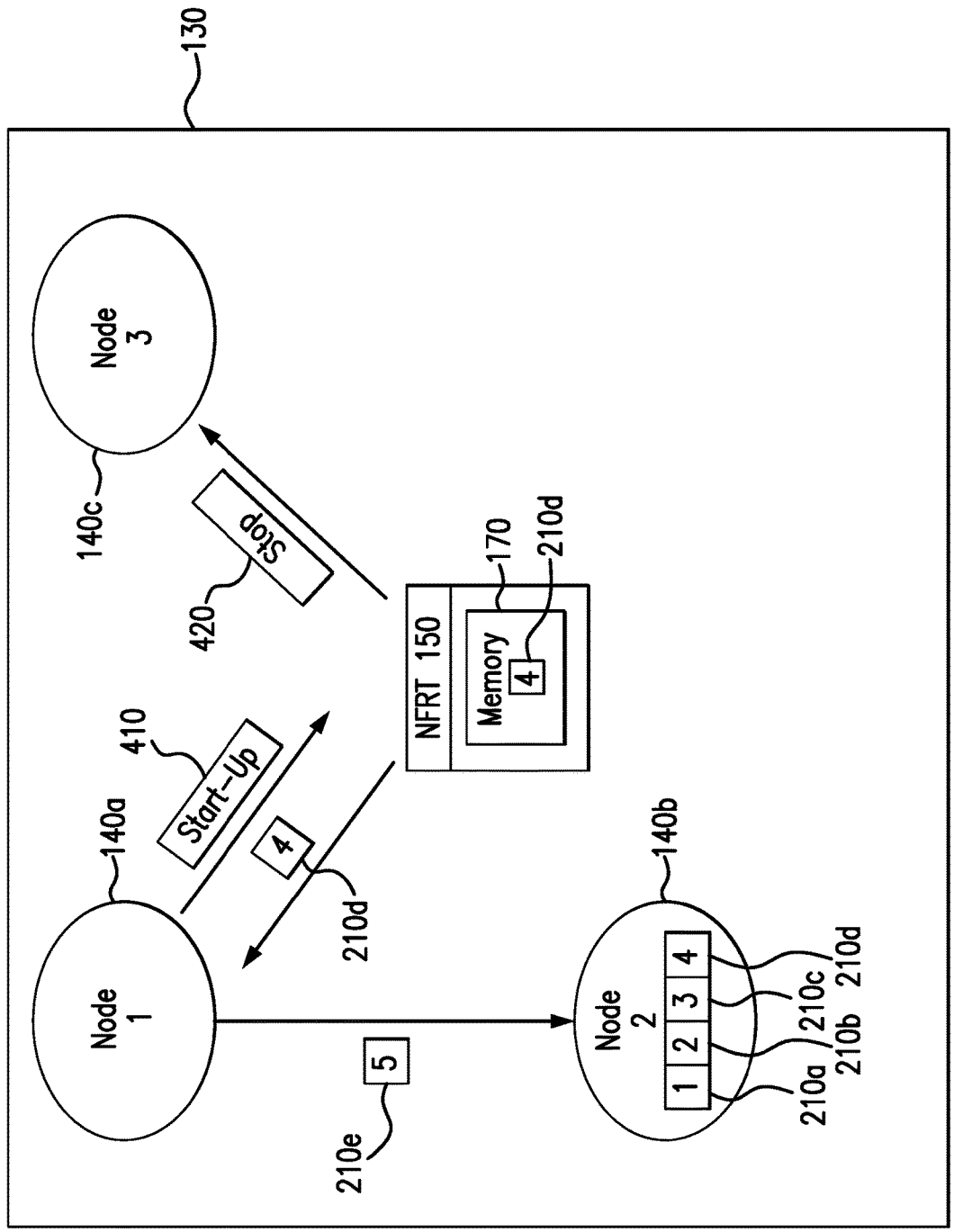
FIG. 4 is a block diagram illustrating an embodiment of the system of FIG. 1 after a crashed node becomes operational, according to certain embodiments.

FIG. 4 illustrates an embodiment of system 130 after a node becomes operational after a crash or failure. As described above, node failure recovery tool 150 may be configured to determine that a node that had previously crashed has since become operational. Node failure recovery tool 150 may make this determination based on receiving a message from the crashed node after determining that the node has crashed. As illustrated in FIG. 4, node 1 140a may send a start-up message 410 to node failure recovery tool 150 upon coming back online or otherwise becoming operational. In another embodiment, node failure recovery tool 150 determines that a previously crashed node is operational by determining that node 1 140a begins/resumes communications with another node. For example, node failure recovery tool 150 may determine that node 1 140a is operational because it receives state information corresponding to an information portion 210. Although this disclosure describes specific ways of determining that a node has become operational, this disclosure recognizes that node failure recovery tool 150 may determine that a crashed node has become operational in any suitable manner.

In some embodiments, node failure recovery tool 150 sends a stop message 420 to back-up node 3 140c after determining that node 1 140a has become operational. Stop message 420 may include instructions for a node 140 to cease communications with a different node. For example, as illustrated in FIG. 4, node failure recovery tool 150 sends a stop message 420 to back-up node 3 140c to instruct node 3 140c to cease communications with node 2 140b. In some embodiments, stop message 420 prevents node 3 140c from sending/continuing to send one or more information portions 210 to node 2 140b. As a result, node 1 140a may send non-duplicative information portions 210 to node 2 140b once it becomes operational after a crash.

As stated above, a crashed node may utilize state information sent by node failure recovery tool 150 to facilitate node recovery. As illustrated in FIG. 4, node failure recovery tool 150 retrieves and sends state information corresponding to the most recently stored information portion 210 (e.g., information portion 210d stored in memory 170) to node 1 140a to facilitate node recovery. Node 1 140a may in turn use this state information to determine a next-in-sequence information portion 210 to send to node 2 140b. Thus, in response to receiving notification that the last information portion 210 sent to node 2 140b was information portion 210d, node 1 140a may determine to send information portion 210e. The sending of information portion 210e to node 2 140b may then result in node failure recovery tool 150's replacement of state information corresponding to information portion 210d with state information corresponding to information portion 210e in memory 170. In this manner, node failure recovery tool 150 may ensure that nodes 140 of system 130 only send the same information portion 210 to a recipient node 140 one time, thereby preventing any duplicative sending and/or processing of information portions 210.

In some embodiments, node failure recovery tool 150 is further configured to determine various statistics associated with one or more nodes 140 of system 130. For example, node failure recovery tool 150 may determine a throughput and/or latency of a node 140 of system 130. As used herein, the throughput of a node 140 may be the rate at which a node 140 can process information (e.g., an information portion 210). In some embodiments, the throughput of a node 140 is based at least on the time that a node 140 receives a particular portion of information (e.g., information portion 210a). As used herein, the latency of a node 140 may be the delay between the sending and relaying of information (e.g., the delay between the receiving and relaying of information portion 210). In some embodiments, the latency of a node 140 is based on amount of time between receiving information (e.g., information portion 210) and publishing that information to another node 140. These and other determinations may be performed by one or more processors 160 of node failure recovery tool 150.

Figure 5:
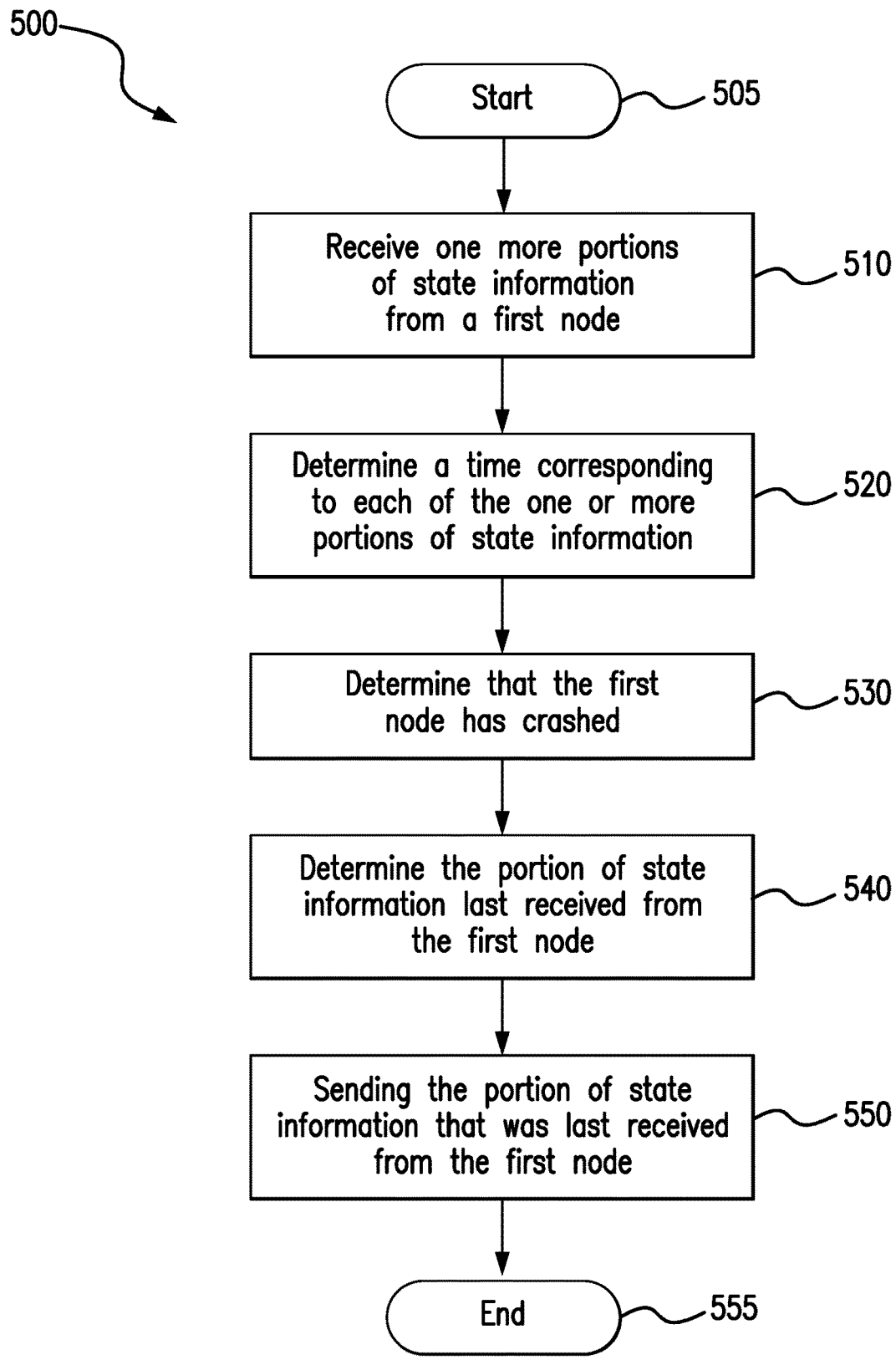
FIG. 5 is a flow chart illustrating a method for facilitating the recovery of a node using the node failure recovery tool of FIG. 4, according to one embodiment of the present disclosure.

FIG. 5 illustrates a method 500 of facilitating the recovery of a node following a crash or other failure of the node. In some embodiments, the method 500 is performed by node failure recovery tool 150. Method 500 may be an algorithm stored to memory 170 of node failure recovery tool 150 and may be executable by processor 160 of node failure recovery tool 150. The method 500 begins in a step 505 and proceeds to step 510. At step 510, node failure recovery tool 150 receives one or more information portions 210 from a first node (e.g., node 1 140a). In some embodiments, each information portion 210 received by node failure recovery tool 150 includes state information. As described above, state information may comprise one or more of data corresponding to a user, data corresponding to an action, and/or an indication of whether the portion of state information is related to one or more other portions of state information. In some embodiments, each information portion 210 received by node failure recovery tool 150 is part of a larger set of data being communicated from one node to another (e.g., from node 1 140a to node 2 140b). In some embodiments, after receiving the one or more portions of state information, the method 500 continues to step 520.

At step 520, node failure recovery tool 150 determines a time corresponding to each of the received portions of state information. In some embodiments, the time corresponding to each portion of state information is based on the time that the node failure recovery tool 150 received the state information. For example, node failure recovery tool 150 may determine that the time corresponding to information portion 210a is 12:00:01 p.m. because it received the state information of information portion 210a at 12:00:01 p.m. As another example, node failure recovery tool 150 may determine that the time corresponding to information portion 210b is 12:00:03 p.m. because it received the state information of information portion 210b at 12:00:03 p.m. As yet another example, node failure recovery tool 150 may determine that the time corresponding to information portion 210c is 12:00:05 p.m. because it received the state information of information portion 210c at 12:00:05 p.m. In some embodiments, the method 500 continues to step 520 after node failure recovery tool 150 determines a time corresponding to each of the received portions of state information.

At step 530, node failure recovery tool 150 determines that the first node (e.g., node 1 140a) has crashed or otherwise failed. In some embodiments, a determination that the first node has crashed is based on a determination that a related information portion 210 was not received before the expiration of a timer. For example, as illustrated in FIG. 3, node failure recovery tool 150 determines that node 1 140a has crashed because it did not receive state information corresponding to information portion 210d prior to the expiration of a timer. As described above, node failure recovery tool 150 may be configured to start a timer upon receiving each information portion 210 and determine whether a related information portion 210 is received prior to the expiration of the timer. In some embodiments, node failure recovery tool 150 is configured to determine that the sending node (e.g., node 1 140a) has crashed/failed if the state information corresponding to the related information portion 210 is not received before expiration of the timer. In other embodiments, node failure recovery tool 150 is configured to determine that the sending node (e.g., node 1 140a) has not crashed/failed if the state information corresponding to the related information portion 210 is received prior to the expiration of the timer. In some embodiments, the method 500 continues to step 540 upon node failure recovery tool 150 determining that the first node (e.g., node 1 140a) has crashed.

At step 540, node failure recovery tool 150 determines a portion of state information that was last received from the first node. In some embodiments, node failure recovery tool 150 determines the portion of state information last received from the first node by identifying the state information last saved in memory 170. Although this disclosure recites specific ways of determining the last information portion 210 received from the first node, this disclosure recognizes that node failure recovery tool 150 may make this determination in any suitable manner. In some embodiments, after node failure recovery tool 150 determines the portion of state information last received from the first node, the method 500 continues to a step 550.

At step 550, the node failure recovery tool 150 sends the portion of state information last received from the first node to the first node. In some embodiments, sending the portion of state information last received from the first node to the first node facilitates the recovery of the first node. For example, the first node receives state information corresponding to the last information portion 210 sent by the first node and uses the received state information to determine a next-in-sequence information portion 210 to send to another node 140 (e.g., node 2 140b) of system 130. In some embodiments, sending the portion of state information last received from the first node to the first node prevents the first node from sending a larger set of data (comprising state information) to the second node more than once. In some embodiments, after node failure recovery tool 150 sends the portion of state information last received from the first node to the first node, the method continues to a terminating step 555.

Figure 6:
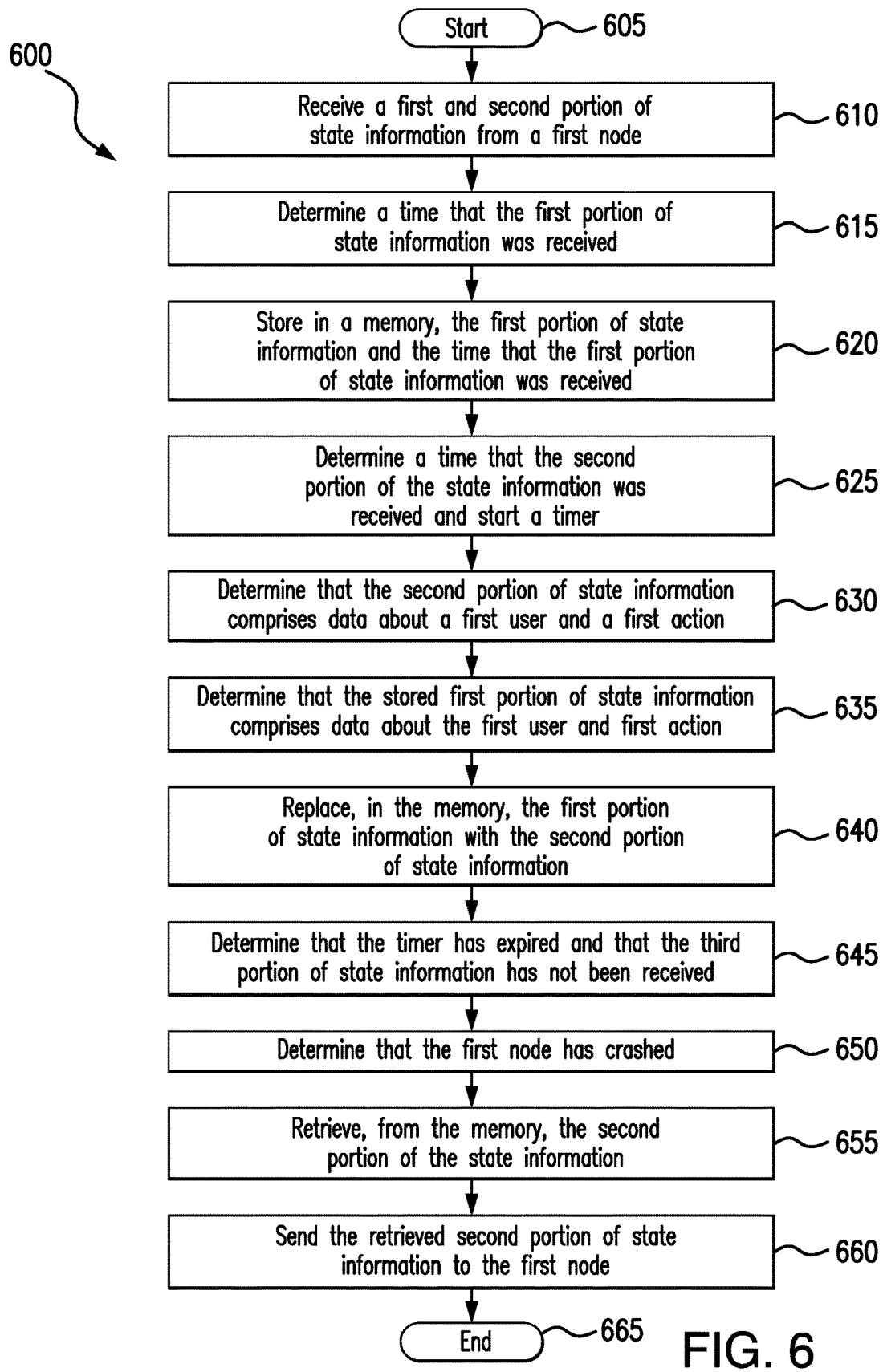
FIG. 6 is a flow chart illustrating another method for facilitating the recovery of a node using the node failure recovery tool of FIG. 4, according to certain embodiments.

FIG. 6 illustrates a method 600 of facilitating the recovery of a node following a crash or other failure of the node. In some embodiments, the method 600 is performed by node failure recovery tool 150. Method 600 may be an algorithm stored to memory 170 of node failure recovery tool 150 and may be executable by processor 160 of node failure recovery tool 150. In some embodiments, one or more steps of method 600 may be included and/or performed in parallel with steps of method 500.

The method 600 begins in a step 605 and proceeds to step 610. At step 610, node failure recovery tool 150 receives a first and a second information portion 210 from a first node (e.g., node 1 140a). In some embodiments, each information portion 210 may be part of a larger set of data being communicated from one node 140 to another. As described above, each information portion 210 may comprise state information which may include one or more of data corresponding to a user 120, data corresponding to an action, and/or an indication of whether the portion of state information is related to one or more other portions of state information. Thus, node failure recovery tool 150 may receive, at step 610, a first and a second portion of state information from the first node. In some embodiments, the method 600 proceeds to step 615 after receiving the first and second portions of state information from the first node.

At step 615, node failure recovery tool 150 may determine a time that the first portion of state information was received. In some embodiments, node failure recovery tool 150 determines the time that the first portion of state information was received based on the time that interface 180 of node failure recovery tool 150 received the first portion of state information. In some embodiments, the method 600 proceeds to step 620 after node failure recovery tool 150 determines a time that the first portion of state information was received.

At step 620, node failure recovery tool 150 stores the first portion of state information and the time that the first portion of state information was received in a memory 170. As described herein, memory 170 may be a memory of node failure recovery tool 150 and/or a memory accessible to node failure recovery tool 150 (e.g., accessible to node failure recovery tool 150 via network 110). In some embodiments, after storing the first portion of state information and the time that the first portion of state information was received in memory 170, the method 600 proceeds to step 625.

At step 625, node failure recovery tool determines a time that the second portion of state information was received and starts a timer. In some embodiments, node failure recovery tool 150 determines the time that the second portion of state information was received based on the time that interface 180 of node failure recovery tool 150 received the second portion of state information. In some embodiments, node failure recovery tool 150 starts the timer in response to and/or simultaneously with determining the time that the second portion of state information was received. In other embodiments, node failure recovery tool 150 starts the timer in response to determining that the second portion of state information is related to a third portion of state information. After starting a timer and determining a received time for the second portion of state information, the method 600 may proceed to step 630.

At step 630, node failure recovery tool 150 determines that the second portion of state information comprises data about a first user and a first action. As described above, state information may comprise, amongst other things, information about one or more of a particular user and/or a particular action. Node failure recovery tool 150 may, in some embodiments, be configured to examine the second portion of state information to identify a particular user and a particular action (e.g., a first user and a first action). After determining that the second portion of state information comprises data about a first user and a first action, the method 600 may continue to step 635.

At step 635, node failure recovery tool 150 determines that the stored first portion of state information comprises data about the first user and the first action. In some embodiments, node failure recovery tool 150 makes this determination by querying memory 170 for the first user and/or first action. In some embodiments, after determining that the stored first portion of state information comprises data about the first user and the first action, the method 600 proceeds to step 640.

At step 640, node failure recovery tool 150 replaces, in the memory (e.g., memory 170), the first portion of state information with the second portion of state information. In some embodiments, determining whether to replace the first portion of state information with the second portion of state information is based on the times that each of the first portion and the second portion of state information was received. For example, node failure recover tool 150 may determine to replace the first portion of state information with the second portion of state information if the second portion of state information was received later in time than the first portion of state information. In some embodiments, after node failure recovery tool 150 replaces the first portion of state information with the second portion of state information in the memory (e.g., memory 170), the method 600 may proceed to step 645.

At step 645, node failure recovery tool 150 determines that the timer has expired and that a third portion of state information has not been received. As explained above, state information may comprise an indication of whether a particular portion of state information is related to one or more other portions of state information. For example, the second portion of state information may include an indication to expect (or not expect) a third portion of state information that is related to the second portion of state information. Upon determining that the timer has expired and that the third portion of state information has not been received, the method 600 may proceed to step 650.

A step 650, node failure recovery tool 150 determines that the first node has crashed. In some embodiments, node failure recovery tool 150 determines that the first node has crashed based on determinations made at step 645. For example, in some embodiments, node failure recovery tool 150 determines that the first node has crashed when the timer has expired and that the third portion of state information has not been received by node failure recovery tool 150. After determining that the first node has crashed or otherwise failed, the method 600 proceeds to step 655.

At step 655, node failure recovery tool 150 retrieves the second portion of state information from the memory (e.g., memory 170). In some embodiments, the second portion of state information stored to memory is the last portion of state information received by node failure recovery tool 150. This disclosure recognizes that node failure recovery tool 150 may retrieve the second portion of state information from memory in any suitable manner, including without limitation identifying the second portion of state information in memory by running queries. In some embodiments, after node failure recovery tool 150 retrieves the second portion of state information from memory, the method 600 continues to a step 660.

At step 660, node failure recovery tool 150 sends the second portion of state information retrieved from memory at step 655 to the first node. In some embodiments, sending the retrieved portion of state information to the first node facilitates the recovery of the first node. For example, the first node receives the retrieved state information and uses the retrieved state information to determine a next-in-sequence information portion 210 to send to another node 140 (e.g., node 2 140b) of system 130. In some embodiments, sending the retrieved portion of state information to the first node prevents the first node from sending a larger set of data (comprising state information) to the second node more than once. In some embodiments, after node failure recovery tool 150 sends the second portion of state information retrieved from memory to the first node, the method continues to a terminating step 665.

Figure 7:
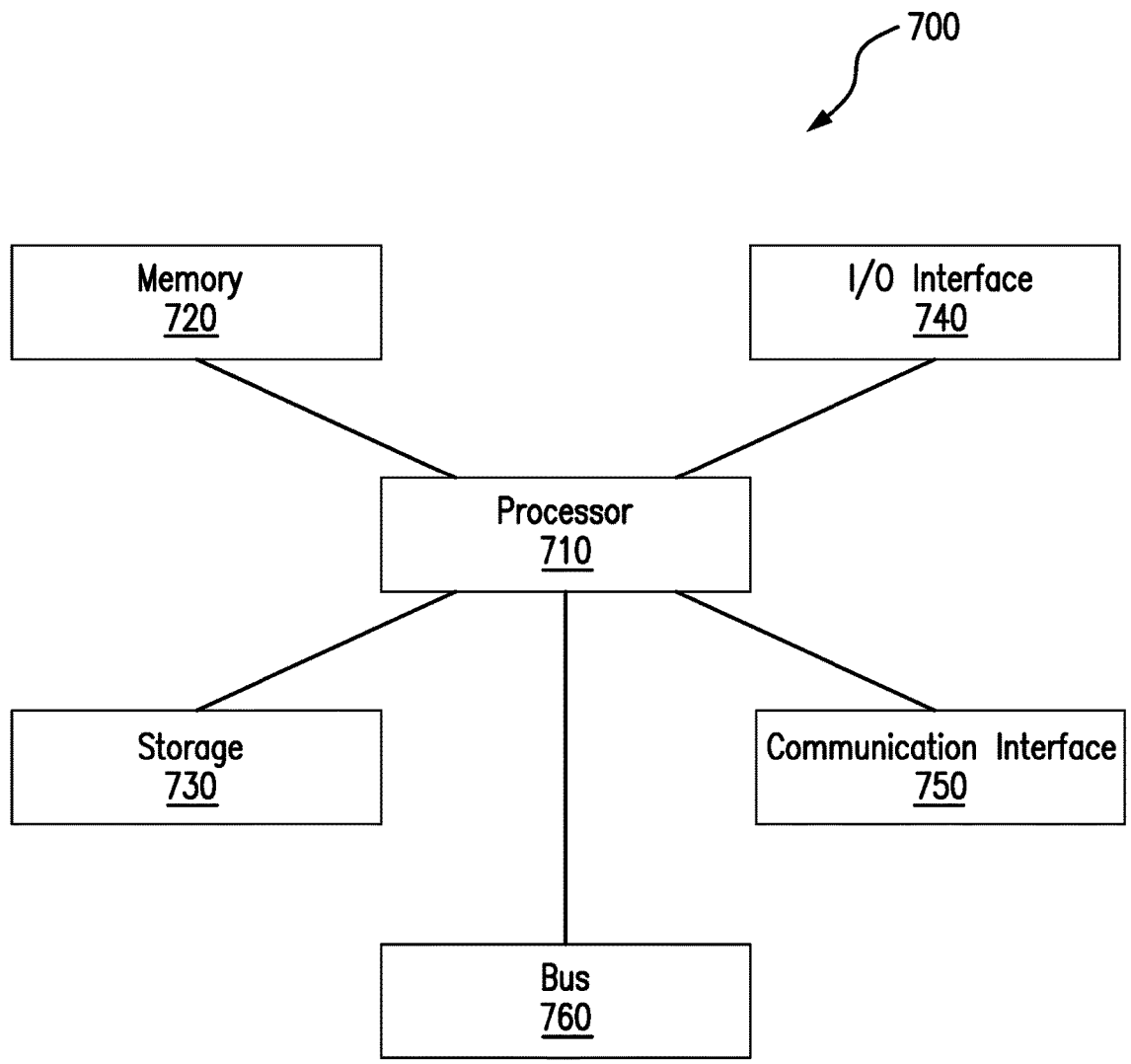
FIG. 7 is a block diagram of a computer configured to implement the methods of FIGS. 5 and 6, according to certain embodiments.

FIG. 7 illustrates an example of a computer system 700. In some embodiments, node failure recovery tool 150 may be a program that is implemented by a processor of a computer system such as computer system 700. Computer system 700 may be any suitable computing system in any suitable physical form. As an example and not by way of limitation, computer system 700 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

One or more computer systems 700 may perform one or more steps of one or more methods described or illustrated herein. In particular embodiments, one or more computer systems 700 may provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As an example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

Computer system 700 may include a processor 710, memory 720, storage 730, an input/output (I/O) interface 740, a communication interface 750, and a bus 760 in some embodiments, such as depicted in FIG. 7. Although this disclosure describes and illustrates a particular computer system having a particular number of particular components in a particular arrangement, this disclosure contemplates any suitable computer system having any suitable number of any suitable components in any suitable arrangement.

Processor 710 includes hardware for executing instructions, such as those making up a computer program, in particular embodiments. For example, processor 710 may execute node failure recovery tool 150 in some embodiments. As an example and not by way of limitation, to execute instructions, processor 710 may retrieve (or fetch) the instructions from an internal register, an internal cache, memory 720, or storage 730; decode and execute them; and then write one or more results to an internal register, an internal cache, memory 720, or storage 730. In particular embodiments, processor 710 may include one or more internal caches for data, instructions, or addresses. This disclosure contemplates processor 710 including any suitable number of any suitable internal caches, where appropriate. As an example and not by way of limitation, processor 710 may include one or more instruction caches, one or more data caches, and one or more translation lookaside buffers (TLBs). Instructions in the instruction caches may be copies of instructions in memory 720 or storage 730, and the instruction caches may speed up retrieval of those instructions by processor 710. Data in the data caches may be copies of data in memory 720 or storage 730 for instructions executing at processor 710 to operate on; the results of previous instructions executed at processor 710 for access by subsequent instructions executing at processor 710 or for writing to memory 720 or storage 730; or other suitable data. The data caches may speed up read or write operations by processor 710. The TLBs may speed up virtual-address translation for processor 710. In particular embodiments, processor 710 may include one or more internal registers for data, instructions, or addresses. This disclosure contemplates processor 710 including any suitable number of any suitable internal registers, where appropriate. Where appropriate, processor 710 may include one or more arithmetic logic units (ALUs); be a multi-core processor; or include one or more processors 175. Although this disclosure describes and illustrates a particular processor, this disclosure contemplates any suitable processor.

Memory 720 may include main memory for storing instructions for processor 710 to execute or data for processor 710 to operate on. As an example and not by way of limitation, computer system 700 may load instructions from storage 730 or another source (such as, for example, another computer system 700) to memory 720. Processor 710 may then load the instructions from memory 720 to an internal register or internal cache. To execute the instructions, processor 710 may retrieve the instructions from the internal register or internal cache and decode them. During or after execution of the instructions, processor 710 may write one or more results (which may be intermediate or final results) to the internal register or internal cache. Processor 710 may then write one or more of those results to memory 720. In particular embodiments, processor 710 executes only instructions in one or more internal registers or internal caches or in memory 720 (as opposed to storage 730 or elsewhere) and operates only on data in one or more internal registers or internal caches or in memory 720 (as opposed to storage 730 or elsewhere). One or more memory buses (which may each include an address bus and a data bus) may couple processor 710 to memory 720. Bus 760 may include one or more memory buses, as described below. In particular embodiments, one or more memory management units (MMUs) reside between processor 710 and memory 720 and facilitate accesses to memory 720 requested by processor 710. In particular embodiments, memory 720 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 720 may include one or more memories 180, where appropriate. Although this disclosure describes and illustrates particular memory, this disclosure contemplates any suitable memory.

Storage 730 may include mass storage for data or instructions. As an example and not by way of limitation, storage 730 may include a hard disk drive (HDD), a floppy disk drive, flash memory, an optical disc, a magneto-optical disc, magnetic tape, or a Universal Serial Bus (USB) drive or a combination of two or more of these. Storage 730 may include removable or non-removable (or fixed) media, where appropriate. Storage 730 may be internal or external to computer system 700, where appropriate. In particular embodiments, storage 730 is non-volatile, solid-state memory. In particular embodiments, storage 730 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 730 taking any suitable physical form. Storage 730 may include one or more storage control units facilitating communication between processor 710 and storage 730, where appropriate. Where appropriate, storage 730 may include one or more storages 140. Although this disclosure describes and illustrates particular storage, this disclosure contemplates any suitable storage.

I/O interface 740 may include hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 185 for them. Where appropriate, I/O interface 740 may include one or more device or software drivers enabling processor 710 to drive one or more of these I/O devices. I/O interface 740 may include one or more I/O interfaces 185, where appropriate. Although this disclosure describes and illustrates a particular I/O interface, this disclosure contemplates any suitable I/O interface.

Communication interface 750 may include hardware, software, or both providing one or more interfaces for communication (such as, for example, packet-based communication) between computer system 700 and one or more other computer systems 700 or one or more networks (e.g., network 110). As an example and not by way of limitation, communication interface 750 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 750 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 750 for any of these networks, where appropriate. Communication interface 750 may include one or more communication interfaces 190, where appropriate. Although this disclosure describes and illustrates a particular communication interface, this disclosure contemplates any suitable communication interface.

Bus 760 may include hardware, software, or both coupling components of computer system 700 to each other. As an example and not by way of limitation, bus 760 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 760 may include one or more buses 212, where appropriate. Although this disclosure describes and illustrates a particular bus, this disclosure contemplates any suitable bus or interconnect.

The components of computer system 700 may be integrated or separated. In some embodiments, components of computer system 700 may each be housed within a single chassis. The operations of computer system 700 may be performed by more, fewer, or other components. Additionally, operations of computer system 700 may be performed using any suitable logic that may comprise software, hardware, other logic, or any suitable combination of the preceding.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, refrigeration system 100 may include any suitable number of compressors, condensers, condenser fans, evaporators, valves, sensors, controllers, and so on, as performance demands dictate. One skilled in the art will also understand that refrigeration system 100 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A node failure recovery tool comprising:
   an interface configured to receive one or more portions of state information from a first node, each of the one or more portions of state information comprising data corresponding to a user and an action and an indication of whether the portion of state information is related to one or more other portions of state information;
   one or more processors configured to:
   determine a time corresponding to each of the one or more portions of state information;
   determine that the first node has crashed, wherein determining that the first node has crashed comprises:
   identifying that a received portion of state information comprising a first user and a first action is related to one or more other portions of state information, wherein the received portion of state information was received after the related one or more other portions of state information, and the first user and the first action are related to the one or more other portions of state information;
   replacing the related one or more other portions of state information with the received portion of state information; and
   determining that the interface did not receive another portion of state information;
   after determining that the first node has crashed, determining, based on the time corresponding to each of the one or more portions of state information, the received portion of state information that was last received from the first node; and
   send, to the first node, the received portion of state information that was last received from the first node, wherein the first node uses the received portion of state information that was last received from the first node to recover from the crash.

2. The node failure recovery tool of claim 1, wherein the failure recovery tool is positioned in a middleware layer of a distribution system.

3. The node failure recovery tool of claim 1, wherein sending the received portion of state information to the first node prevents the node recovery tool from receiving state information that was previously received from the first node.

4. The node failure recovery tool of claim 3, wherein the one or more processors are further configured to determine a throughput corresponding to the first node, wherein the throughput is based at least on the one or more determined times corresponding to the one or more portions of state information received from the first node.

5. The node failure recovery tool of claim 3, wherein the one or more processors are further configured to determine a latency corresponding to the first node, wherein the latency is based on an amount of time that has passed between a first node's receipt of a first portion of state information and a first node's sending of the first portion of state information.

6. The node failure recovery tool of claim 1, wherein each portion of state information received from the first node is a portion of a larger set of data that the first node is communicating to a second node.

7. The node failure recovery tool of claim 6, wherein sending the received portion of state information that was last received from the first node to the first node prevents the first node from sending the portion of the larger set of data to the second node more than once.

8. A method comprising:
receiving, at an interface, one or more portions of state information from a first node, each of the one or more portions of state information comprising data corresponding to a user and an action and an indication of whether the portion of state information is related to one or more other portions of state information;
determining a time corresponding to each of the one or more portions of state information;
determining that the first node has crashed, wherein determining that the first node has crashed comprises:
identifying that a received portion of state information comprising a first user and a first action is related to one or more other portions of state information, wherein the received portion of state information was received after the related one or more other portions of state information, and the first user and the first action are related to the one or more other portions of state information;
replacing the related one or more other portions of state information with the received portion of state Information; and
determining that the interface did not receive another portion of state information;
after determining that the first node has crashed, determining, based on the time corresponding to each of the one or more portions of state information, the received portion of state information that was last received from the first node; and
sending, to the first node, the received portion of state information that was last received from the first node, wherein the first node uses the received portion of state information that was last received from the first node to recover from the crash.

9. The method of claim 8, wherein sending the received portion of state information to the first node prevents the node recovery tool from receiving state information that was previously received from the first node.

10. The method of claim 8, further comprising determining a throughput corresponding to the first node, wherein the throughput is based at least on the one or more determined times corresponding to the one or more portions of state information received from the first node.

11. The method of claim 8, further comprising determining a latency corresponding to the first node, wherein the latency is based on an amount of time that has passed between a first node's receipt of a first portion of state information and a first node's sending of the first portion of state information.

12. The method of claim 8, wherein each portion of state information received from the first node is a portion of a larger set of data that the first node is communicating to a second node.

13. The method of claim 12, wherein sending the received portion of state information that was last received from the first node to the first node prevents the first node from sending the portion of the larger set of data to the second node more than once.

14. A system comprising:
a first node configured to send one or more portions of state information, wherein each portion of state information comprises data corresponding to a user and an action and an indication of whether the portion of state information is related to one or more other portions of state information; and
a node failure recovery tool comprising:
an interface configured to receive one or more portions of state information from a first node; and
one or more processors configured to:
determine a time corresponding to each of the one or more portions of state information;
determine that the first node has crashed, wherein determining that the first node has crashed comprises:
identifying that a received portion of state information comprising a first user and a first action is related to one or more other portions of state information, wherein the received portion of state information was received after the related one or more other portions of state information, and the first user and a first action are related to the one or more other portions of state information;
replacing the related one or more other portions of state information with the received portion of state information; and
determining that the interface did not receive another portion of state information;
after determining that the first node has crashed, determining, based on the time corresponding to each of the one or more portions of state information, the received portion of state information that was last received from the first node; and
send, to the first node, the received portion of state information that was last received from the first node, wherein the first node uses the received portion of state information that was last received from the first node to determine a next portion of data to send to the second node.

15. The system of claim 14, wherein the failure recovery tool is positioned in a middleware layer of a distribution system.

16. The system of claim 14, wherein sending the received portion of state information to the first node prevents the node recovery tool from receiving state information that was previously received from the first node.

17. The system of claim 14, wherein the one or more processors are further configured to determine a throughput corresponding to the first node, wherein the throughput is based at least on the one or more determined times corresponding to the one or more portions of state information received from the first node.

18. The system of claim 14, wherein the one or more processors are further configured to determine a latency corresponding to the first node, wherein the wherein the latency is based on an amount of time that has passed between a first node's receipt of a first portion of state information and a first node's sending of the first portion of state information.

19. The system of claim 14, wherein each portion of state information received from the first node is a portion of a larger set of data that the first node is communicating to a second node.

20. The system of claim 19, wherein sending the received portion of state information that was last received from the first node to the first node prevents the first node from sending the larger set of data to the second node more than once.

\* \* \* \* \*